(12) United States Patent
Currle et al.

(10) Patent No.: US 6,872,135 B2
(45) Date of Patent: Mar. 29, 2005

(54) HEATING AND/OR AIR-CONDITIONING SYSTEM WITH VENTILATION AND EVACUATION

(75) Inventors: Joachim Currle, Stuttgart (DE); Frank Fruehauf, Aichwald (DE); Florian Kauf, Stuttgart (DE); Juergen Maué, Weilheim/Teck (DE); Juergen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/301,812

(22) Filed: Nov. 22, 2002

(65) Prior Publication Data

US 2003/0124969 A1 Jul. 3, 2003

(30) Foreign Application Priority Data

Nov. 23, 2001 (DE) .......................................... 101 57 499

(51) Int. Cl.[7] ................................................ B60H 1/00
(52) U.S. Cl. ...................................... 454/139; 454/141
(58) Field of Search ................................ 454/139, 140, 454/141, 142

(56) References Cited

U.S. PATENT DOCUMENTS

| | | | | |
|---|---|---|---|---|
| 2,234,268 A | * | 3/1941 | McCollum | ................. 237/28 |
| 4,494,597 A | | 1/1985 | Fukami et al. | |
| 4,711,159 A | * | 12/1987 | Armbruster | ................. 454/137 |
| 4,763,564 A | * | 8/1988 | Czarnecki et al. | ............. 454/75 |
| 4,807,523 A | * | 2/1989 | Radtke et al. | ............... 454/137 |
| 4,913,347 A | * | 4/1990 | Burst et al. | .................... 236/13 |
| 5,280,852 A | * | 1/1994 | Dauvergne | ............. 237/12.3 A |
| 5,302,152 A | * | 4/1994 | Auvity | ........................ 454/127 |
| 5,439,415 A | * | 8/1995 | Hirikawa et al. | ............. 454/70 |
| 5,449,321 A | * | 9/1995 | Dauvergne | ................... 454/139 |
| 5,673,747 A | | 10/1997 | Kousaka et al. | |
| 5,681,218 A | * | 10/1997 | Kishi et al. | ................... 454/75 |
| 5,733,190 A | * | 3/1998 | Wahab | ........................ 454/164 |
| 6,332,330 B1 | * | 12/2001 | Loup et al. | ................... 62/244 |
| 6,491,578 B2 | * | 12/2002 | Yoshinori et al. | ........... 454/139 |
| 2001/0029162 A1 | | 10/2001 | Yoshinori et al. | |

FOREIGN PATENT DOCUMENTS

| | | |
|---|---|---|
| DE | 2750671 A1 | 5/1979 |
| DE | 2828719 A1 | 1/1980 |
| DE | 2836406 C2 | 6/1988 |
| DE | 19801979 A1 | 7/1998 |
| DE | 19807002 A1 | 10/1998 |
| DE | 19923189 C1 | 11/2000 |
| DE | 19947076 C1 | 4/2001 |
| DE | 19947567 A1 | 4/2001 |
| JP | 64-6744 | 1/1989 |

* cited by examiner

*Primary Examiner*—Derek S. Boles
(74) *Attorney, Agent, or Firm*—Crowell & Moring LLP

(57) ABSTRACT

A heating and/or air-conditioning system for vehicles, preferably passenger vehicles, has a central air-conditioning and/or air-conveying device for conditioning and/or conveying air. In order to achieve optimum air conditioning of the vehicle interior and sufficient freedom of the windows from misting with the most effective energy use possible, the air within the vehicle interior is fed so that, for example, outside air and circulating air are fed into the vehicle interior through dedicated air inlet openings and removed from the vehicle interior through dedicated air outlet openings. The air is guided on closed flow paths in order to achieve separation of circulating air and outside air.

17 Claims, 3 Drawing Sheets

HEATING AND/OR AIR-CONDITIONING SYSTEM WITH VENTILATION AND EVACUATION

This application claims the priority of German application 101 57 499.1, filed Nov. 23, 2001, the disclosure of which is expressly incorporated by reference herein.

Reference is also made to co-pending U.S. patent applications Ser. No. 10/301,873, filed Nov. 22, 2002, titled HEATING AND/OR AIR CONDITIONING SYSTEM HAVING A DECENTRALIZED AIR-CONVEYING DEVICE, and Ser. No. 10/301,824, filed Nov. 22, 2002, titled HEATING AND/OR AIR-CONDITIONING SYSTEM.

BACKGROUND AND SUMMARY OF THE INVENTION

The present invention relates to a heating and/or air-conditioning system for a vehicle interior including a central air-conditioning device, an air-conveying device, or an air-conditioning and air-conveying device for at least one of regulating the temperature of, cooling, drying, humidifying, cleaning, and conveying air, and a plurality of air inlet and air outlet openings distributed in the vehicle interior.

In order to obtain a pleasant climate for the occupants of a vehicle, it is endeavoured to provide temperature layering in the vehicle interior. This is based on the principle of "warm feet, cool head", i.e. the aim is to achieve a warm footwell and a cooler head and upper body.

Air-conditioning systems therefore often have separate air ducts for the foot region and the head region, the air ducts of the foot region being charged with warmer air than those of the head region.

In order to reduce the energy use which is required for conditioning the air, the vehicle interior is not only fed with pure fresh air, but part of the already pre-conditioned air from the vehicle interior is also used. Since this air in the interior has, for example in heating operation in winter, a higher temperature than the outside air, the energy use required for heating purposes is therefore reduced. However, the air in the interior is, as a rule, very humid and can therefore only be re-used to a limited extent, since otherwise the windows could become misted from the inside.

German publication DE 198 01 979 A1 discloses a vehicle air-conditioning system which has outside-air intake openings and inside-air intake openings. The air-conditioning housing has a separating plate which separates the air-conditioning housing into two air passages, so that the outside air is guided through one part of the air-conditioning housing and the inside air is guided through the other part. In order to prevent the windows from becoming misted, the outside air is then blown in the direction of the windscreen and the inside air in the direction of the foot region. However, the air which is blown in becomes thoroughly mixed in the interior quite rapidly, so that, in order to avoid a misting tendency, ventilation has to be carried out using a high proportion of outside air. The energetic advantage obtained is therefore relatively low, especially in view of the construction which is still very complicated and therefore also quite expensive. In addition, the inside air has first of all to be conveyed from the vehicle interior to the air-conditioning housing, conveyed through the latter and subsequently conveyed back into the vehicle interior, which has the consequence of very high flow losses which, in turn, have to be compensated for via a powerful fan.

One object of the invention is the object of providing a heating and/or air-conditioning system for a vehicle interior, which system is constructed simply in terms of structure and makes good heating and/or cooling of the vehicle interior possible with as little energy use as possible. The heating and/or air-conditioning system is preferably to be designed in such a manner that it prevents, with a proportion of outside air which is as small as possible, the windows from becoming misted from the inside.

This object is achieved according to the invention by a heating and/or air-conditioning system in which the air inlet openings and the air outlet openings are assigned to one another so that the air fed into the vehicle interior through one of the air inlet openings is for the most part removed through an assigned air outlet opening.

A plurality of air inlet openings and a plurality of air outlet openings are provided in the vehicle interior. In this case, the direction of the air inlet refers to the vehicle interior, so that the air inlet opening ventilates the vehicle interior and the air outlet opening evacuates the vehicle interior. The air inlet openings and the air outlet openings are arranged in such a manner that an air inlet opening or a number of air inlet openings interact with an air outlet opening or a number of air outlet openings, so that predetermined air flows are formed in the vehicle interior. An air inlet opening or a number of air inlet openings is/are assigned to an air outlet opening or a number of air outlet openings. In particular, the exact amount of air fed into the vehicle interior through an air inlet opening or a number of air inlet openings is removed again through the assigned air outlet opening or the assigned air outlet openings. It is therefore possible to feed differently conditioned air, for example differently temperature-regulated air or differently humid air, at the same time next to one another into the vehicle interior and to remove this air again and, in the process, largely to avoid an undesirable mixing of the differently conditioned air.

The air inlet and air outlet openings are preferably designed and/or arranged in such a manner that the air fed through an air inlet opening flows along a closed flow path to the assigned air outlet opening or the assigned air outlet openings. The formation of the closed flow paths in the vehicle interior is essential in order also to obtain a separation of differently conditioned air inside the vehicle.

Provision is made for the central air-conditioning and/or air-conveying device, i.e. the device arranged at a central point in the vehicle, for example in the engine compartment or in the cockpit region, to convey outside air and to condition it in accordance with the desired interior climate in a manner which can be set in advance. This means, for example, that in winter cold outside air has to be greatly heated up or in summer hot outside air has to be greatly cooled, for which purpose a correspondingly high expenditure of energy is required in each case. The central air-conditioning and/or air-conveying device may comprise a fan and/or a heat exchanger and/or an evaporator for preparing and/or conveying the air.

In order now to provide a pleasant interior climate in the vehicle with a low expenditure of energy, interior air which has already been pre-conditioned is therefore advantageously used for air-conditioning purposes; this is referred to as a circulating-air operation. However, this circulating air has the disadvantage that it is humid. This interior air can therefore only be used in the region of the footwell, since otherwise an impairment of the comfort of the occupant occurs or even, as a consequence of the humid circulating air, the windows could become misted from the inside.

One concept of the present invention therefore envisages separating the flow paths not only for the conditioning and/or conveying of the air, but also in the interior of the vehicle. The misting tendency is therefore reduced and the required expenditure of energy, preferably for heating purposes, is reduced. In particular, the proportion of outside air which is additionally to be conditioned with high energy use is reduced by reducing a thorough mixing of the air in the interior.

In order to obtain a particularly good separation of the flow paths, use is preferably made of surfaces which are present in the vehicle interior as guiding surfaces for the flow. Thus, for example, one flow can be guided along the windows and the roof lining and/or one flow can be guided along the floor and a seat surface in a footwell.

One design of the invention envisages the air inlet openings and the air outlet openings having a rectangular air inlet surface or air outlet surface with a narrow transverse extent and long longitudinal extent. As a result, in a first approach, the air is dispensed into the inside of the vehicle and also removed again linearly, so that a virtually two-dimensional flow is produced which is guided, for example, along the windows and the roof The two-dimensional flow may also become closed, by appropriate air conveying and/or arrangement of the air inlet and air outlet surfaces, to form a three-dimensional flow configuration, for example a roller, in order readily to aerate the footwell, in particular.

One advantageous design of the invention envisages forming individual air inlet openings as outside-air inlet openings and the associated air outlet openings as outside-air outlet openings. Accordingly, it is also envisaged to form individual air inlet openings as circulating-air inlet openings and the associated air outlet openings as circulating-air outlet openings. Air inlet openings and air outlet openings which can be switched between outside-air and circulating air may also be provided.

The heating and/or air-conditioning system may, in particular, have a plurality of operating modes, and thus, for example, a pure circulating-air operation may be provided, in which more circulating-air outlet openings are required, or a pure outside-air operation may be provided, in which more outside-air outlet openings are required, in which case individual air inlet openings and air outlet openings can be correspondingly switched. A mixed operation having variable, preferably preselectable proportions of outside air to circulating air is also provided.

In an advantageous manner, openings guiding the outside air can be arranged in the head or chest region of the vehicle interior, and openings guiding the circulating air can be arranged in the footwell, for example in the driver's footwell and/or front passenger's footwell and/or rear footwell. A layering of the air in the vehicle interior is thus obtained, in which case fresh and/or dry and/or conditioned outside air is arranged at the top in the head/chest region of the vehicle interior and circulating air is arranged in the footwell or the footwells.

One advantageous design of the invention envisages the circulating air being circulated in the footwell in a roller-shaped or cylindrical manner. The roller-shaped or cylindrical circulation of the circulating air produces an inherently closed and stable flow configuration in the footwell, so that an undesirable thorough mixing of the circulating air with outside air is greatly suppressed.

In one design, it is envisaged, for the roller-shaped circulation, to arrange in the footwell a unit for conditioning and/or conveying circulating air, which unit comprises a circulating-air inlet opening and an associated circulating-air outlet opening. A unit of this type is preferably arranged in each footwell, so that one unit for conditioning and/or conveying circulating air is present per vehicle occupant. The circulating-air outlet opening of the unit can be connected to the circulating-air inlet opening via a local air-recycling duct, i.e. a duct which is arranged locally in the vehicle interior, the duct being formed separately and in a spatially separate manner from the central air-conveying and/or air-conditioning device. The circulating-air outlet opening and the circulating-air inlet opening can be arranged closely adjacent, so that the air-recycling duct can be relatively short and, consequently, also only has a small flow resistance. Furthermore, components for conditioning the circulating air, for example a heat exchanger and/or electrical heating system and/or a Peltier element and/or air filter and/or devices for air drying and/or air humidifying can be arranged in the air-recycling duct. The circulating air therefore remains locally in the region of the footwell and is conditioned with very low flow resistances at a local point. Long and structurally complicated air ducts which, in addition, are very much afflicted by losses are therefore avoided.

In order to convey the air, provision is furthermore made for a local air-conveying unit to be arranged in the local air-recycling duct of the unit. The air-conveying unit is advantageously designed as a disc fan. The disc fan has a rotating assembly of a plurality of parallel discs of small thickness, two discs in each case bounding an air gap situated in between. The disc fan is designed in such a manner that its intake direction and its blow-off direction are situated in one plane. Owing to this characteristic construction, the disc fan requires, in particular, the formation of stable and inherently closed flow rollers. It is likewise of advantage that the disc fan has, owing to its manner of construction, only a very low noise level, so that complicated noise-damping measures, which are associated with flow losses, can be reduced or entirely omitted.

It is also envisaged to design the fan as an axial fan, in particular as a roller-type fan.

In one design of the invention, it is envisaged that the units which are arranged locally in the footwell and are intended for conditioning and/or conveying circulating air can be controlled and/or regulated independently, so that a passenger can set an individual climate in his region. Furthermore, it is also envisaged that the units can be controlled as a function of the central air-conveying and air-conditioning device, so that central heating and/or climate settings are possible.

Designs are also possible which provide, in addition to circulating-air operation, pure outside-air operation for rapidly changing the interior climate, for example drying and/or cooling and/or heating it, or a mixed operation of outside air and/or circulating air. In particular, individual air inlet openings and/or air outlet openings are designed such that they can be switched, so that they can be switched from circulating-air inlet operation to outside-air inlet operation or from circulating-air outlet operation to outside-air outlet operation.

Further features and embodiments of the invention will be apparent from the claims, the figures and the description of the figures. The features and combinations of features which are mentioned above and are described in the following text can be used not only in the respectively stated combination, but also in other combinations or on their own without departing from the scope of the invention.

Further designs of the invention are illustrated and explained in the drawing figures.

BRIEF DESCRIPTION OF THE DRAWING FIGURES

DETAILED DESCRIPTION OF THE INVENTION

Figure 1:
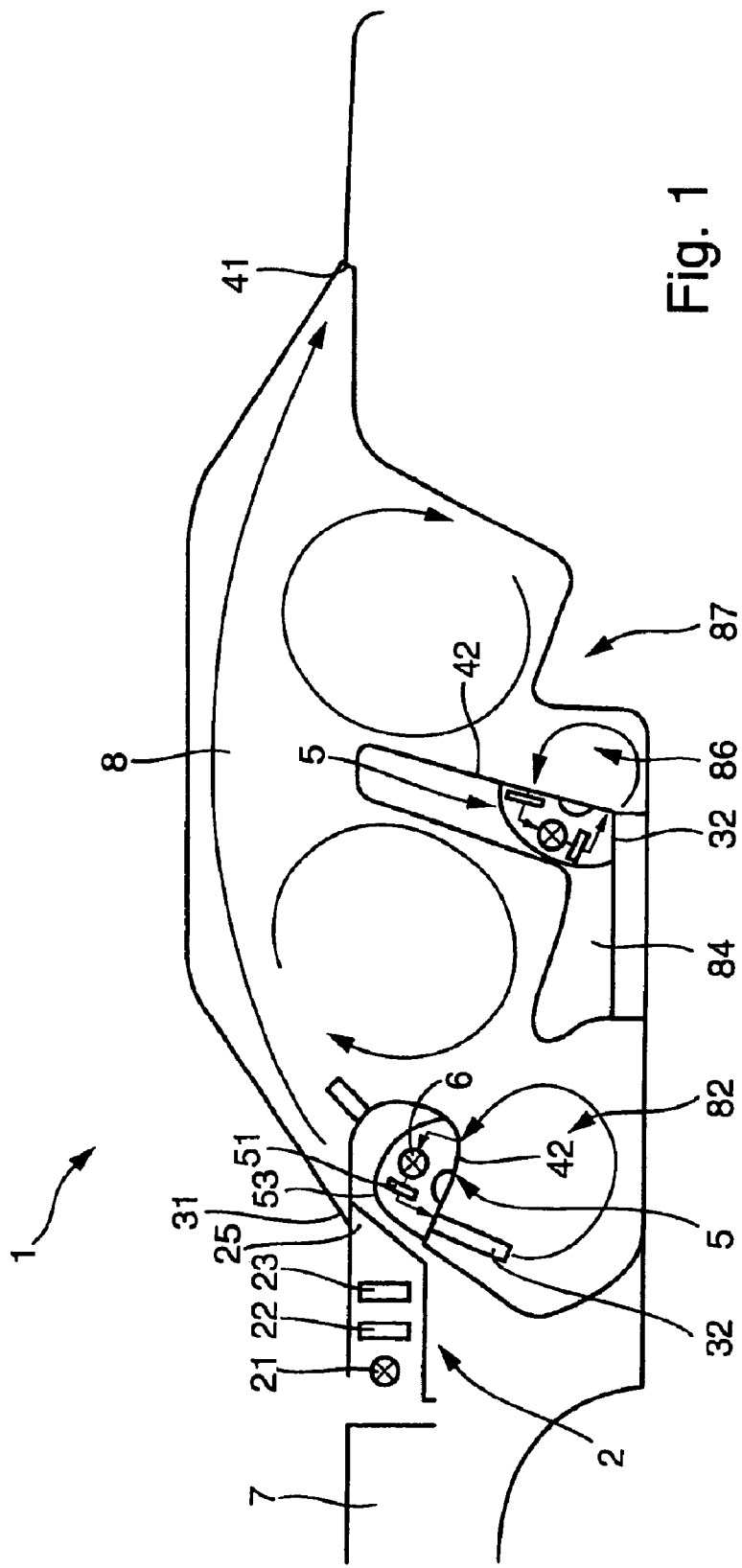
FIG. 1 shows the heating and/or air-conditioning system in a vehicle, in a side view, with a schematic illustration of air flows.
Figure 2:
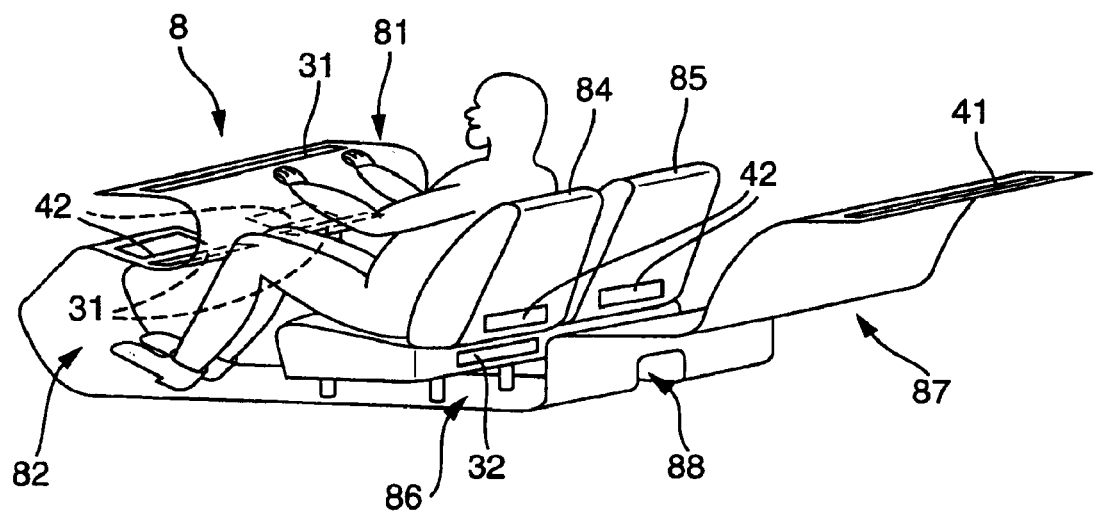
FIG. 2 shows a perspective illustration of the vehicle interior with an exemplary arrangement of ventilation and evacuation surfaces.

FIG. 1 shows an arrangement of the heating and/or air-conditioning system 1 in a passenger vehicle in a schematic side view. The heating and/or air-conditioning system 1 comprises an air-conditioning housing 2 which is arranged centrally in the engine compartment 7 and in which a central air-conditioning and/or air-conveying device is arranged, and a plurality of local units 5 which are distributed in the vehicle interior 8 and are intended for air conditioning and/or air conveying. The vehicle interior 8 is also illustrated in a three-dimensional perspective in FIG. 2.

In the front region of the vehicle interior 8, a cockpit 81 is arranged at the bottom adjoining a windscreen. The boundary surface of the cockpit 81 continues downwards and merges into the boundary of the driver's footwell 82 and front passenger's footwell (not indicated). The vehicle interior 8 has a largely flat interior floor which is divided in the longitudinal direction of the vehicle by a central tunnel 88. A driver's seat 84 and a front passenger's seat 85, which are in each case arranged such that they can be displaced in the longitudinal direction of the vehicle, are fastened on the interior floor. The rear side of the vehicle interior 8 is terminated by a rear seat bench 87. Fitted to the upper end of the rear seat bench is a rear window shelf which covers the remaining space to the rear window and can be used as a storage space.

The vehicle interior 8 is relatively fissured and has a plurality of spaces bordered by boundary surfaces. The front seats, i.e. the driver's seat and the front passenger's seat, divide the vehicle interior into a front section in front of the driver's seat 84 and front passenger's seat 85 and a rear part between the rear seat bench 87 and driver's seat 84 and front passenger's seat 85. In addition, the vehicle interior 8 is divided in the lower region in the longitudinal direction by the central tunnel 88, so that the driver's footwell 82 is partitioned off from the front passenger's footwell (not indicated). In the upper region of the vehicle interior, in the head and chest region of the passengers, there is a free interior section which is arranged between the upper end of the seats 84, 85 or their head rests and the roof lining and extends from the cockpit 81, which is arranged at the front, to the rear to the upper end of the rear seat bench 87.

The heating and/or air-conditioning system 1 according to the invention has, for each of those sections of the vehicle interior 8 which are to be ventilated, correspondingly designed air inlet openings 31, 32 and air outlet openings 41, 42 assigned thereto.

The central air-conveying and/or air-conditioning device 2, i.e. a central air-conveying unit 21, a heat exchanger 23 and an evaporator 22, is arranged in the air-conditioning housing, which is arranged centrally in the engine compartment. The air-conveying unit 21 conveys outside air through the heat exchanger 23 and the evaporator 22 and through air ducts into the vehicle interior 8. The outside air flows from outside into the air-conditioning housing 2 and is guided via a water box which separates off any water which has been entrained. In addition, adjustable flaps and bypassing ducts are arranged in the air-conditioning housing 2 in order to conduct the outside air, depending on the desired temperature and/or humidity, through the heat exchanger 23 and/or the evaporator 22 or just some of it through them or around them. The outside air can therefore be conditioned as desired in accordance with the desired interior climate.

The conditioned outside air enters the vehicle interior 8 via an outside-air inlet opening 31 arranged on the windscreen in the region of the cockpit. This outside-air inlet opening 31 extends at the lower end of the windscreen over a large part of the width of the cockpit 81 or of the vehicle. The outside-air inlet opening 31 is assigned an outside-air outlet opening 41 arranged in the region of the rear window. The outside-air outlet opening is arranged in the lower region of the rear window, in the region of the rear window shelf, and likewise extends over a large part of the vehicle width.

The outside-air inlet opening 31 is arranged in such a manner that outside air which is blown in, as illustrated by an arrow in FIG. 1, is guided along the existing boundary surfaces of the interior, such as windscreen, roof lining and rear window, to the outside-air outlet opening 41. This conditioned outside air therefore flows to the windows and the head region of the passengers.

In the vehicle interior 8, in the delimited subspaces, for example the driver's footwell 82 and/or front passenger's footwell 83 and/or rear footwell 86, local units 5 for the local air conditioning and/or air conveying are arranged in such a manner that a targeted ventilation of these locally delimited spaces via the air inlet opening and air outlet opening belonging to the unit is made possible.

Figure 3:
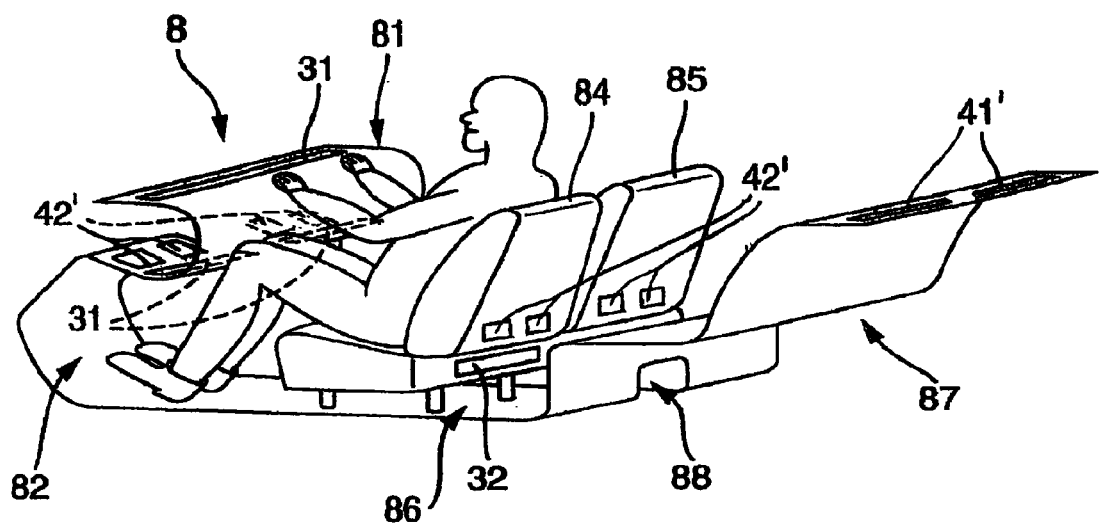
FIG. 3 shows a perspective illustration similar to FIG. 2 but in which an air inlet opening has two assigned air outlet openings.

On the lower side of the cockpit 81, a circulating-air outlet opening 42 is arranged pointing downwards to the region of the driver's footwell. The circulating-air inlet opening 32, which is assigned to the opening, is likewise arranged on the lower region of the cockpit and is situated, as seen in the direction of travel, in front of the circulating-air outlet opening 42. In a modification to the design illustrated, the circulating-air inlet opening 32 can also be situated to the rear of the circulating-air outlet opening, as seen in the direction of travel. The circulating-air outlet opening 42 is connected to the circulating-air inlet opening 32 by an air-recycling duct 53. A local air-conveying unit 6 and a local heat exchanger 51 are arranged in the air-recycling duct 53. In another modification, shown in FIG. 3, an air inlet opening such as 32 can have two assigned air outlet openings 42', while an air inlet opening such as 31 can have two assigned air outlet openings 41'.

The circulating air is conducted by the circulating-air inlet opening 32 along the boundary surface on the front wall of the driver's footwell 82, is deflected counter to the direction of travel on the interior floor, and then flows along the front surface of the driver's seat cushion towards the circulating-air outlet opening 42. The circulating air is taken in again there by the air-conveying unit 6 and blown again into the driver's footwell through the air-recycling duct 53 and the circulating-air inlet opening 32. A circulating-air circuit having a roller-shaped or cylindrical flow path, which is again indicated in FIG. 1 by an arrow, is thus formed in the driver's footwell.

Each of the circulating-air inlet opening 32 and the circulating-air outlet opening 42 has a rectangular base surface with a narrow transverse extent and a long longitudinal extent. The longitudinal extent runs transversely to the longitudinal direction of the vehicle and is matched to the width of the flow roller.

A local unit 5 for local air conditioning and/or air conveying, which unit is constructed and arranged in a similar manner to the above-described local unit 5, is also arranged in the front passenger's footwell.

Provision is made for the local fan 6 and/or the local heat exchanger 51 to be individually settable. The driver can thus individually set the local temperature and/or the strength of the local circulation of the circulating air in the footwell. Furthermore, provision is made to control the fan 6 and/or the heat exchanger 51 together with the central air-conveying unit 21 and/or the central heat exchanger 22 and/or the central evaporator 23 or further locally arranged units via a control device, in order to control a preset air-conditioning program, for example a rapid heating up or cooling down of the vehicle interior 8.

A local unit 5 for the local air conditioning and/or air conveying is likewise arranged in the driver's seat 84 and the front passenger's seat 85. The circulating-air inlet opening 32 in each case is arranged here at the rear, lower edge of the seat cushion, so that the circulating air flows out in the direction of the rear footwell 86 in a manner directed towards the floor of the interior. The air flows along the boundary surface of the interior floor and is deflected upwards at the front side of the rear seat bench 87. The assigned circulating-air outlet opening 42, which takes in the air flow deflected at the rear seat bench 87, is arranged on the backrest of the driver's seat 84 and/or front passenger's seat 85, level with the seat surface of the rear seat bench 87. The circulating-air inlet opening 32 and the circulating-air outlet opening 42 of the local unit 5, which is arranged in the driver's seat 84 or front passenger's seat 85, are arranged and/or designed in such a manner that a locally delimited and/or closed air flow is formed in the footwell behind the driver's seat 84 and/or front passenger's seat 85. Provision is furthermore made for the units 5, which are arranged in the seats 84, 85, to be constructed in a similar manner to the above-described units 5.

In a modification to the design illustrated, provision is also made for the direction of flow to be turned around by interchanging the circulating-air inlet opening with the circulating-air outlet openings, so that an air roller rotating in an opposite direction to the air roller illustrated arises.

The seats 84, 85 having the integrated, local units 5 can also advantageously be used in buses or passenger trains, in particular for the individually settable air conditioning of individually, locally delimited regions, for example of a seat.

The local units 5 circulate the circulating air along closed, roller-shaped flow paths. The formation of stable flow rollers ensures that, for the most part, the air which is fed into the vehicle interior 8 from an air inlet opening 31, 41 is removed through the associated air outlet opening 32, 42.

As illustrated in FIG. 1, the cylindrical or roller-shaped circulating-air flows are arranged in the region of the footwells 82, 83, 86. The conditioned outside air is guided along the roof. These flows, which are caused by active ventilation, can bring about further, corresponding air flows which likewise have a roller-type shape and are arranged in front of the seat surface or backrest surface of the driver's seat 84 or front passenger's seat 85. Contact surfaces are formed where the individual flows come into contact, for example in the roof region or footwell region. A slight mixing of the different air flows is possible in each case at these contact points.

A predominantly layered air flow is formed in the vehicle interior 8 by the arrangement of the air inlet openings 31, 32 and air outlet openings 41, 42. Conditioned outside air or fresh air is guided in the upper region of the vehicle interior. Predominantly circulating air is guided in the lower region of the vehicle interior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A heating and/or air-conditioning system for a vehicle interior, comprising:

a central air-conditioning device, air-conveying device, or air-conditioning and air-conveying device for at least one of regulating the temperature of, cooling, drying, humidifying, cleaning, and conveying air, and a plurality of air inlet and air outlet openings distributed in the vehicle interior, wherein the air inlet openings and the air outlet openings are assigned to one another so that conditioned outside air fed into the vehicle interior through an outside-air inlet opening is adapted for the most part to be guided in an upper region of the vehicle interior along boundary surfaces of the vehicle and removed from the vehicle interior through an outside-air outlet opening and circulating air in the vehicle interior is adapted for the most part to be recycled in a lower region of the vehicle interior from a circulating-air inlet opening to a circulating-air outlet opening.

2. The heating and/or air-conditioning system according to claim 1, wherein the circulating-air inlet and outlet openings are mutually assigned air inlet openings and air outlet openings which are designed, which can be controlled, or which are designed and can be controlled so that the air fed through the circulating-air inlet opening forms, in the vehicle interior, a closed flow path which points from the circulating-air inlet opening to the circulating-air outlet opening assigned thereto.

3. The heating and/or air-conditioning system according to claim 1, wherein the air inlet openings and air outlet openings are assigned to one another in pairs so that an air inlet opening has an air outlet opening assigned to it.

4. The heating and/or air-conditioning system according to claim 1, wherein the air inlet openings and air outlet openings are assigned to one another so that an air inlet opening has two assigned air outlet openings.

5. The heating and/or air-conditioning system according to claim 1, wherein each of the air inlet openings has a rectangular inlet surface and each of the air outlet openings has a rectangular outlet surface, and wherein each of said openings has a short transverse extent and a long longitudinal extent.

6. The heating and/or air-conditioning system according to claim 1, wherein the outside-air inlet opening is of switchable design so that it can be switched between operation as an outside-air inlet opening and a circulating-air inlet opening.

7. The heating and/or air-conditioning system according to claim 1, wherein the outside-air outlet opening is of switchable design so that it can be switched between operation as an outside-air outlet opening and a circulating-air outlet opening.

8. The heating and/or air-conditioning system according to claim 1, wherein the outside-air inlet opening is arranged in the region of a window, and wherein the outside-air outlet opening is arranged in the region of an opposite window so that a closed outside-air flow path is guided along the windows and a vehicle roof.

9. The heating and/or air-conditioning system according to claim 1, wherein the outside-air inlet opening is arranged at one end of a window, and wherein the outside-air outlet opening is arranged at an opposite end of the window so that the outside-air flow path is guided along the window.

10. A heating and/or air-conditioning system for a vehicle interior, comprising:
   a central air-conditioning device, air-conveying device, or air-conditioning and air-conveying device for at least one of regulating the temperature of, cooling, drying, humidifying, cleaning, and conveying air, and
   a plurality of air inlet and air outlet openings distributed in the vehicle interior,
   wherein the air inlet openings and the air outlet openings are assigned to one another so that the air fed into the vehicle interior through one of the air inlet openings is for the most part removed through an assigned air outlet opening,
   wherein at least some of the air inlet openings are circulating-air inlet openings and at least some of the air outlet openings are circulating-air outlet openings assigned thereto,
   wherein a plurality of units, each comprising a circulating-air inlet opening and a circulating-air outlet opening assigned thereto, are distributed in footwells of the vehicle so that at least one unit is arranged in at least one of a footwell of the driver, a footwell of the front passenger, and a rear footwell, and
   wherein provision is made for longitudinal extents of circulating-air inlet surfaces and circulating-air outlet surfaces to run in a transverse direction of the vehicle.

11. The heating and/or air-conditioning system according to claim 10, wherein at least one of the units is arranged or formed in one of the footwells so that a closed circulating-air flow path has a roller-type shape with an axis oriented transversely to a direction of travel.

12. The heating and/or air-conditioning system according to claim 1, wherein a dedicated, local air-recycling duct formed separately from the central device connects the circulating-air inlet opening to the circulating-air outlet opening.

13. The heating and/or air-conditioning system according to claim 12, wherein the local air-recycling duct has a local air-conveying unit.

14. The heating and/or air-conditioning system according to claim 1, wherein the boundary surfaces of the vehicle are at least one of window surfaces, bodywork surfaces, and seat surfaces.

15. The heating and/or air-conditioning system according to claim 2, wherein the outside-air inlet opening is of switchable design so that it can be switched between operation as an outside-air inlet opening and a circulating-air inlet opening.

16. The heating and/or air-conditioning system according to claim 2, wherein the outside-air outlet opening is of switchable design so that it can be switched between operation as an outside-air outlet opening and a circulating-air outlet opening.

17. The heating and/or air-conditioning system according to claim 13, wherein said local air-conveying unit can be controlled as a function of the central device.

* * * * *